Patented Mar. 18, 1952

2,589,445

UNITED STATES PATENT OFFICE 2,589,445

ORGANOSILICON ACIDS

Leo H. Sommer, State College, Pa., assignor to Dow Corning Corporation, Midland, Mich., a corporation of Michigan No Drawing. Application June 3, 1949,
Serial No. 97,083

19 Claims. (Cl. 260—448.2)

The present invention relates to organosilicon carboxy acids and their production.

In the organosilicon art the principal developments heretofore have been in the field of silanes in which the silicon is linked to hydrocarbon or chlorohydrocarbon radicals and to hydrolyzable substituents such as chlorine and ethoxy. From such silanes, the presently well known silicones are obtained by hydrolysis and condensation. These materials owe their present importance in large measure to their water-repellent properties. Materials such as the dimethylpoly-siloxanes are not only water-repellent but are immiscible with water.

Objects of the present invention are the provision of organosilanes which contain carboxy substituted alkyl radicals; the provision of organosilanes which contain polar solubilizing radicals; and the provision of methods for the preparation thereof.

Products in accordance herewith are silanes which contain three radicals each selected from the group consisting of alkyl, monocyclic aryl and silico-neopentyl [$(CH_3)_3SiCH_2$—] there being not more than one silico-neopentyl radical per silicon atom. Thus, compounds in accordance herewith are of the general formula $$R_{3-x}R'_xSiC_nH_{2n}COOH$$

where R represents a radical selected from the group consisting of alkyl and monocyclic aryl radicals, R' represents a silico-neopentyl radical, $x$ is an integer from 0 to 1 inclusive, and $n$ has a positive value from 2 to 18 inclusive.

In this series of acids, the lower molecular weight acids, particularly those in which each R represents methyl, are somewhat soluble in water in the acid form. Where $n$ is of higher value, the acids become more insoluble in water despite the solubilizing effect of the carboxy group. These acids are quite distinct from those in which $n$ is equal to one. In those acids the carbon atom, $\beta$ to the silicon, is substituted with oxygen. Accordingly, cleavage of the entire radical occurs and such compounds are therefore unstable. Those acids are of substantial value, where an organosilicon material is desired which has an easily cleaved radical bonded to the silicon by a carbon to silicon bonding. They are of utility in processes of rendering materials water-repellent by impregnating or coating the material to be made water-repellent with an aqueous solution or dispersion of the compound followed by decomposition of the carboxy methyl radical and by the simultaneous formation of the siloxane from the organosilicon residue. Likewise, the sodium salts of those acids in which $n$ equals one may be employed in aqueous solution for water-repellent treatment. The present compounds are distinguished from such acids inasmuch as there are at least two carbon atoms in a chain between the silicon and the carboxy radical.

The compositions hereof, in which $n$ has a value of at least 2, are characterized by the great stability of these acids. They may be reacted to form alkali metal and quaternary ammonium salts (including soaps) and used in aqueous solution. These solutions are excellent emulsifying agents for diorganopolysiloxane oils, such as dimethylpolysiloxane. These compositions, in which $n$ has a value of at least 2, are further of utility in the production of other organosilicon materials as intermediates. Further, esters of these acids may be prepared by reaction thereof with aliphatic alcohols which esters have a sweet, fruity odor, frequently with a slight musty character desirable for blending in the perfumery industry.

A convenient method for the synthesis of these silyl substituted aliphatic acids is the well known malonic ester synthesis. In this method, the diethyl ester of malonic acid is reacted with sodium ethoxide in ethanol to produce the sodiomalonic ester. This material is then reacted with an alkyl halide to substitute the alkyl radical for one of the two active hydrogens initially present on the central carbon atom of the malonic ester. The derivative so obtained is then saponified with an alkali metal hydroxide to obtain the disodium salt which is then acidified to obtain the dibasic acid, which when heated decarboxylates with the loss of one carboxyl radical. By this method carboxy acids are obtained in which the alkyl radical of the alkyl halide is substituted on the carbon atom, alpha to the carboxy radical.

This synthesis has been tried in the past using as the alkyl halide, neopentyl chloride $$[(CH_3)_3CCH_2Cl]$$

and neopentyl iodide. These attempts have been reported in the literature. The malonic ester synthesis does not work with compounds of this character.

A preferred method for the preparation of the products hereof is by the reaction of compounds of the type $R_3SiC_mH_{2m}X$ with sodiomalonic esters. In this type formula R represents alkyl, monocyclic aryl or silico-neopentyl and $m$ has an average value of from 1 to 17. Preferred methods in accordance herewith involve the use of compounds in which $m$ has a value of one or a value of at least three, due to the relative instability of the materials in which $m$ has a value of two making the procedure more difficult to operate in the latter case.

Thus, it is to be seen that although the malonic ester type of synthesis is inoperative with highly branched alkyl halides, this synthesis is operative with the silicon analogues thereof.

It is to be noted that the malonic ester type of synthesis is not available for the production of the acids which contain one methylene radical between the carboxy group and the silicon atom.

The products hereof may also be prepared by the acetoacetic ester type of synthesis. This method is of particular importance in the production of acids which have two methylenes or four or more methylenes interposed between the carboxy group and the silicon atom. In this method the sodium salt of the ethyl ester of acetoacetic acid is first formed by reacting the ethyl ester of acetoacetic acid with sodium ethoxide in ethanol. This sodium salt is then reacted with an iodoalkyl substituted silane whereby to link the alkyl group to the alpha carbon of the acid and to eliminate sodium iodide. The ester is then converted to the acid and the aceto group is cleaved by conventional means as employed in the prototype synthesis, whereby there is obtained the carboxy substituted alkylsilane.

Halogenoalkylsilanes of the type employed in the above processes have been described in the literature.

Example 1

25 g. of sodium were added to 500 ml. of absolute ethanol to form a solution of sodium ethoxide in ethanol. Diethyl malonate was then added in amount of 168 g. with stirring. This mixture was heated and 122.5 g. of chloromethyltrimethylsilane was added gradually over a period of one hour. This mixture was refluxed until the reaction was substantially complete. The mixture was then acidified by the addition of 1.5 ml. of glacial acetic acid. The ethanol was removed by distillation. The residual salt was dissolved in 250 ml. of water and the solution so formed was extracted twice with 100 ml. portions of diethyl ether following which it was extracted with 100 ml. of benzene. The extracts were combined and distilled to remove the solvents. The residue was fractionated whereby there were obtained ethyl β-trimethylsilylpropionate (I) and diethyl trimethylsilylmethylmalonate (II).

(I) was saponified by reacting it with an equivalent weight of sodium hydroxide. Upon neutralization with hydrochloric acid, the product β-trimethylsilylpropionic acid (III) is obtained.

The structures of these materials are as follows:

(I)  $Me_3Si(CH_2)_2COOC_2H_5$ (II) 
$$Me_3SiCH_2-\underset{\underset{COOC_2H_5}{|}}{\overset{\overset{COOC_2H_5}{|}}{C}}-H$$

(III) $Me_3Si(CH_2)_2COOH$

This acid is likewise produced by the saponification and decarboxylation of (II). In this procedure (II), in amount of 29.5 g., was mixed with 16.8 g. of potassium hydroxide and 17 ml. of water. The ester was dissolved by heating to 90° C. The solution was refluxed for two hours and then distilled to remove the ethanol and water. Concentrated hydrochloric acid was then added in amount of 32.4 ml. and the mixture refluxed for an additional hour. At this time, the reaction product was constituted of two liquid phases. The lower aqueous phase was removed and the upper product layer was heated at 180° C. for 12 hours during which carbon dioxide was liberated. The product was fractionated in order to obtain (III) in relatively pure form.

The properties of the products are as follows:

|  | $d_{20}$ | $n_D^{20}$ | B.P.°C. | M.P.°C. |
|---|---|---|---|---|
| (I) | 0.8772 | 1.4198 | 92/40 mm | fluid. |
| (II) | 0.9680 | 1.4310 | 118/13 mm | Do. |
| (III) |  | 1.4279 | 130/34 mm | 20–22. |

A solution of sodium ethoxide in absolute ethanol was prepared by adding 2.3 g. of sodium to 50 ml. of ethanol. 24.6 g. of (II) was added. To the solution so prepared, 6 g. of urea in 50 ml. of absolute ethanol at 70° C. were added. The mixture so prepared was heated and refluxed for 7 hours. 9 ml. of concentrated hydrochloric acid in 100 ml. of hot water was added to the product. There was thereby obtained a trimethylsilylmethyl substituted barbituric acid which is physiologically an active product.

Example 2

Diethyl phenyldimethylsilylmethylmalonate (IV) was prepared by the method of Example 1 from 9.2 g. of sodium, 200 ml. of absolute ethanol, 64 g. of diethyl malonate and 74 g. of chloromethyldimethylphenylsilane. The product (IV) so obtained was saponified and decarboxylated by the same method used in Example 1, employing 32 g. of potassium hydroxide, 32 ml. of water and 45.2 g. of (IV), and then 50 ml. of concentrated hydrochloric acid and 50 ml. of water. The product dimethylphenylsilylpropionic acid (V) was thereby obtained.

The structures and properties of these compounds are as follows:

(IV)
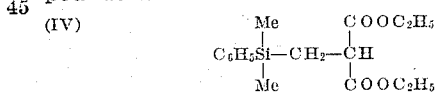

(V)
$$C_6H_5\underset{\underset{Me}{|}}{\overset{\overset{Me}{|}}{Si}}-(CH_2)_2COOH$$

|  | $d_{20}$ | $n_D^{20}$ | B. P. °C./1 mm. | M. P. °C. |
|---|---|---|---|---|
| (IV) | 1.042 | 1.4900 | 132 | fluid |
| (V) | 1.037 | 1.5148 | 116 | 27.0–27.5 |

The dimethylphenylsilylmethyl substituted barbituric acid may be prepared as in Example 1.

Example 3

1,1-dicarbethoxy-3,3,5,5-tetramethyl-3,5-disilahexane (VI) and 4,4,6,6-tetramethyl-4,6-disilaheptanoic acid (VII) were prepared as below described.

The structure of the compounds is as follows:

(VI)
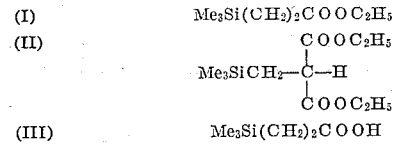

(VII)
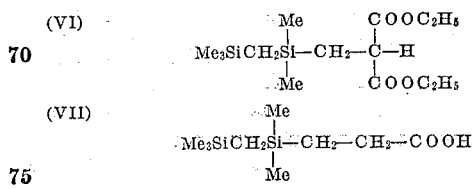

Compound (VI) was prepared as in Example 1 using 3.9 g. of sodium, 90 ml. of absolute ethanol, 29 g. of diethyl malonate and 48.6 g. of iodomethylpentamethyldisilmethylene (Me₃SiCH₂SiMe₂CH₂I)

Compound (VI) was then saponified and decarboxylated as in Example 1 using 15 g. of potassium hydroxide, 15 ml. of water and 31.8 g. of (VI) and then 28 ml. of concentrated hydrochloric acid. The properties of the products so obtained were as follows:

|  | $d_{20}$ | $n_D^{20}$ | B.P.°C. | M.P.°C. |
|---|---|---|---|---|
| (VI) | 0.9516 | 1.4460 | 88–90/0.5–1 mm | fluid. |
| (VII) | 0.9165 | 1.4521 | 123/4 mm | Ca. −2 |

From (VI) the trimethylsilylmethyldimethylsilylmethyl substituted barbituric acid may be prepared as in Example 1.

Example 4

Diethyl gamma-(trimethylsilyl)-propyl malonate (VIII) and omega-trimethylsilylvaleric acid (IX) were prepared as in Example 1.

The structure of these materials is as follows:

(VIII)
$$\text{Me}_3\text{Si}(\text{CH}_2)_3\overset{\displaystyle |}{\underset{\displaystyle |}{\text{CH}}}\begin{matrix}\text{COOC}_2\text{H}_5\\ \\ \text{COOC}_2\text{H}_5\end{matrix}$$

(IX)    Me₃Si(CH₂)₄COOH

These compounds were prepared by identically the same method employed in Examples 1 to 3 using gamma-bromopropyltrimethylsilane as the raw material. The properties of the two products are as follows:

|  | $d_{20}$ | $n_D^{20}$ | B.P.°C. | M.P.°C. |
|---|---|---|---|---|
| (VIII) | 0.9472 | 1.4330 | 95/2 mm | fluid. |
| (IX) | 0.9047 | 1.4358 | 134/14 mm | ca. 0 |

Example 5

From diethyl trimethylsilylmethylmalonate (II), prepared as described in Example 1, there was prepared alpha-methyl-β-trimethylsilylpropionic acid (XI). This preparation was effected by reacting 61.5 g. of (II) with sodium ethoxide in absolute ethanol prepared from 5.75 g. of sodium and 125 ml. of absolute ethanol. The sodium salt so prepared was reacted with 39 g. of methyl iodide. The procedure being the same as for the malonic ester syntheses in the preceding examples. There was thereby obtained diethyl (trimethylsilylmethyl)methylmalonate (X). (X) was saponified and decarboxylated by the method described in Example 1 whereby the product (XI) was obtained.

The structures and properties of these compositions are as follows:

(X)
$$\text{Me}_3\text{SiCH}_2\!-\!\overset{\displaystyle |}{\underset{\displaystyle |}{\text{C}}}\!-\!\text{Me}\begin{matrix}\text{COOC}_2\text{H}_5\\ \\ \text{COOC}_2\text{H}_5\end{matrix}$$

(XI)
$$\text{Me}_3\text{SiCH}_2\!-\!\overset{\text{Me}}{\underset{|}{\text{CH}}}\!-\!\text{COOH}$$

|  | $d_{20}$ | $n_D^{20}$ | B.P.°C. |
|---|---|---|---|
| (X) | 0.9663 | 1.4351 | 122/15 mm. |
| (XI) | 0.9102 | 1.4312 | 118/13 mm. |

Example 6

The compound (III) of Example 1 was prepared as follows:

Sodium ethoxide in ethanol was prepared as above indicated from 30 g. of sodium and one liter of absolute ethanol. 170 g. of ethyl acetoacetate was added thereto. To the reaction product 300 g. of iodomethyltrimethylsilane was added. The solution was stirred and heated under reflux until the reaction was substantially complete. The ethanol was stripped from the product, and the residue was extracted with water. The stripped and washed product was fractionally distilled whereby the intermediate product (I) was obtained and the principal product ethyl α-trimethylsilylmethylacetoacetate was obtained. 30 g. of this acetoacetate were added to sodium ethoxide prepared from 23 g. of sodium and 300 cc. of ethanol. The mixture was stirred and heated at 90° C. for 12 hours following which it was cooled. 60 g. of acetic acid was then added to effect neutralization. The sodium acetate was washed out with water. The product was fractionally distilled whereby there was obtained (I) which was saponified and neutralized to obtain (III).

Example 7

Gamma-bromopropyltrimethylsilane, in amount of 39 g., was added to 4.8 g. of magnesium in 80 ml. of absolute ether, whereby the Grignard reagent of the bromide was formed. This ethereal solution of the Grignard reagent was poured into 140 g. of powdered solid carbon dioxide suspended in 200 ml. of absolute ether. Dilute hydrochloric acid was added to the carbonated Grignard reagent in amount sufficient to effect hydrolysis thereof. The product was washed with water and fractionated whereby gamma-trimethylsilylbutyric acid was produced. The properties of this compound are as follows:

$d_{20}$ ---------------------------------- 0.9098
$n_D^{20}$ ---------------------------------- 1.4325
B. P. °C ---------------------------------- 91/5 mm.
M. P. °C ---------------------------------- 4°

Example 8

Omega-bromo-n-amyltrimethylsilane, in amount of 31 g., was added to 3.5 g. of magnesium and 60 ml. of anhydrous ether whereby the Grignard reagent of the bromide was prepared. This Grignard reagent was added to a suspension of 3.4 mols of powdered solid carbon dioxide in 50 ml. of ether. The complex so formed was decomposed by adding 10 ml. of concentrated hydrochloric acid in 25 ml. of water. The ether layer was separated, the ether was distilled, and the residue was fractionated. The product obtained was omega-trimethylsilylcaproic acid which had the following properties:

$d_{20}$ ------------ 0.8923
$n_D^{20}$ ------------ 1.4389
B. P. °C -------- 76–82/ca. 0.1 mm.–260/738 mm.
M. P. °C -------- −7° to −7.5°

In the above examples, the abbreviation Me has been employed to represent the methyl radical.

That which is claimed is:

1. Compositions of the general formula $$R_{3-x}R'_xSiY_aZ_{1-a}$$

where each R represents a radical selected from the group consisting of alkyl and monocyclic aryl radicals, R' is silico-neopentyl, $a$ and $x$ are integers from 0 to 1 inclusive, $x$ having a value of 0 when any R is monocyclic aryl, Y represents a radical of the formula $[C_nH_{2n}(COOH)]$ where $n$ is an integer of from 2 to 18 inclusive, and Z represents a radical of the formula $$[C_mH_{2m}CH(COOC_2H_5)_2]$$

where $m$ is an integer of from 1 to 17 inclusive.

2. Compositions of the general formula $$(CH_3)_3SiY_aZ_{1-a}$$

where $a$ is an integer of from 0 to 1 inclusive, Y represents a radical having the formula $$[C_nH_{2n}(COOH)]$$

where $n$ is an integer of from 2 to 18 inclusive, and Z represents a radical having the formula $[C_mH_{2m}CH(COOC_2H_5)_2]$ where $m$ is an integer of from 1 to 17 inclusive.

3. Compositions of the general formula $$C_6H_5(CH_3)_2SiY_aZ_{1-a}$$

where $a$ is an integer from 0 to 1 inclusive, Y represents a radical having the formula $$[C_nH_{2n}(COOH)]$$

where $n$ is an integer of from 2 to 18 inclusive, and Z represents a radical having the formula $[C_mH_{2m}CH(COOC_2H_5)_2]$ where $m$ is an integer of from 1 to 17 inclusive.

4. Compositions of the general formula $$(CH_3)_3SiCH_2Si(CH_3)_2Y_aZ_{1-a}$$

where $a$ is an integer of from 0 to 1 inclusive, Y is a radical having the formula $[C_nH_{2n}(COOH)]$ where $n$ is an integer of from 2 to 18, and Z is a radical having the formula $$[C_mH_{2m}CH(COOC_2H_5)_2]$$

where $m$ is an integer of from 1 to 17 inclusive.

5. Compositions of the general formula $$R_{3-x}R'_xSiC_nH_{2n}COOH$$

where each R represents a radical of the group consisting of alkyl and monocyclic aryl radicals, R' is a silico-neopentyl radical, $x$ is an integer of from 0 to 1 inclusive and has a value of 0 when any R is a monocyclic aryl radical, and $n$ is an integer of from 2 to 18 inclusive.

6. Compositions of the general formula $$R_{3-x}R'_xSi(CH_2)_2COOH$$

where each R represents a radical of the group consisting of alkyl and monocyclic aryl radicals, R' represents a silico-neopentyl radical, and $x$ is an integer of from 0 to 1 inclusive, having a value of 0 when any R is a monocyclic aryl radical.

7. $(CH_3)_3SiC_nH_{2n}COOH$ where $n$ has an average value of from 2 to 18.

8. $C_6H_5(CH_3)_2SiC_nH_{2n}COOH$ where $n$ has an average value of from 2 to 18.

9. $(CH_3)_3SiCH_2Si(CH_3)_2C_nH_{2n}COOH$ where $n$ has an average value of from 2 to 18.

10. $(CH_3)_3Si(CH_2)_2COOH$.

11. $C_6H_5(CH_3)_2Si(CH_2)_2COOH$.

12. $(CH_3)_3SiCH_2Si(CH_3)_2(CH_2)_2COOH$.

13. Compositions of the general formula $$R_{3-x}R'_xSiC_mH_{2m}CH(COOC_2H_5)_2$$

where each R represents a radical of the group consisting of alkyl and monocyclic aryl radicals, R' is a silico-neopentyl radical, $x$ is an integer of from 0 to 1 inclusive and has a value of 0 when any R is a monocyclic aryl radical, and $m$ is an integer of from 1 to 17 inclusive.

14. $(CH_3)_3SiCH_2CH(COOC_2H_5)_2$.

15. $C_6H_5(CH_3)_2SiCH_2CH(COOC_2H_5)_2$.

16. The method of preparing triorganosilyl substituted aliphatic carboxy acids which comprises reacting an alkali metal salt of diethyl malonate with a tetraorganosilane having the general formula $R_{3-x}R'_xSi(CH_2)_mX$, where R represents a radical of the group consisting of alkyl and monocyclicaryl radicals, R' is a silico-neopentyl radical, X is a halogen atom, $x$ is an integer of from 0 to 1 inclusive and has a value of 0 when any R is a monocyclic aryl radical, and $m$ is an integer of from 1 to 17 inclusive, saponifying the reaction product with an alkali metal hydroxide solution, and hydrolyzing and decarboxylating the saponified material by acidifying.

17. The method in accordance with claim 16 in which X is chlorine and $m$ is 1.

18. The method in accordance with claim 16 in which $m$ is an integer of from 3 to 17 inclusive.

19. The method for preparing a triorganosilylalkyl malonate diester which comprises interacting a halogenoalkyltriorganosilane of the general formula $R_{3-x}R'_x(CH_2)_mX$, where R represents a radical of the group consisting of alkyl and monocyclicaryl radicals, R' is a silico- neopentyl radical, X is a halogen atom, $x$ is an integer of from 0 to 1 inclusive and has a value of 0 when any R is a monocyclicaryl radical, and $m$ has a value of from 1 to 17 inclusive, with an alkali metal salt of diethyl malonate.

LEO H. SOMMER.

REFERENCES CITED

The following references are of record in the file of this patent:

UNITED STATES PATENTS

| Number | Name | Date |
| --- | --- | --- |
| 2,488,449 | Trautman | Nov. 15, 1949 |
| 2,479,374 | Krieble | Aug. 16, 1949 |

OTHER REFERENCES

Sommer et al., "Jour. Am. Chem. Soc.," vol. 71 (Apr. 1949), page 1509.